United States Patent [19]
Halling et al.

[11] Patent Number: 5,418,354
[45] Date of Patent: May 23, 1995

[54] SELF SERVICE CART SYSTEM

[76] Inventors: Leonard W. Halling, 3076 Electro Dr. S., Colorado Springs, Colo. 80906; Dale B. Halling, 1135 Maple Ave., Downers Grove, Ill. 60515

[21] Appl. No.: 109,421

[22] Filed: Aug. 20, 1993

[51] Int. Cl.⁶ ............................................. G06K 15/00
[52] U.S. Cl. ....................................... 235/383; 186/28
[58] Field of Search .................... 235/385, 383; 186/28

[56] References Cited
U.S. PATENT DOCUMENTS

| | | | |
|---|---|---|---|
| 4,020,916 | 5/1977 | Noble | 180/65 R |
| 4,071,740 | 1/1978 | Gogulski | 235/432 |
| 4,180,204 | 12/1979 | Koenig et al. | 235/385 |
| 4,373,133 | 2/1983 | Clyne et al. | 235/383 |
| 5,059,951 | 10/1991 | Kaltner | 235/487 |
| 5,170,045 | 12/1992 | Bengtsson | 235/383 |
| 5,250,789 | 10/1993 | Johnsen | 235/385 |
| 5,295,064 | 3/1994 | Malec et al. | 364/401 |

*Primary Examiner*—Davis L. Willis
*Assistant Examiner*—Peter J. Rashid
*Attorney, Agent, or Firm*—Dale B. Halling

[57] ABSTRACT

A self service cart system is provided to speed throughput at a check out counter and thus reduce space devoted to check out counters. The cart comprises a bar code scanner for acquiring a price and a description of a product, a security scanner for converting a tag from an unsecured state to a secured state, a magnetic card reader for activating the cart and a controller. The controller stores the price and description of all products in a store and keeps a running total of the price of the products scanned and placed in the cart and coordinates the various activities of the various parts of the cart system. An inventory control computer is connected to the cart's controller at the check out counter to down load the price and description of the products scanned. The products then pass through a security sensor which determines if the products are in the secured state and raises an alarm if the products are in the unsecured state.

15 Claims, 4 Drawing Sheets

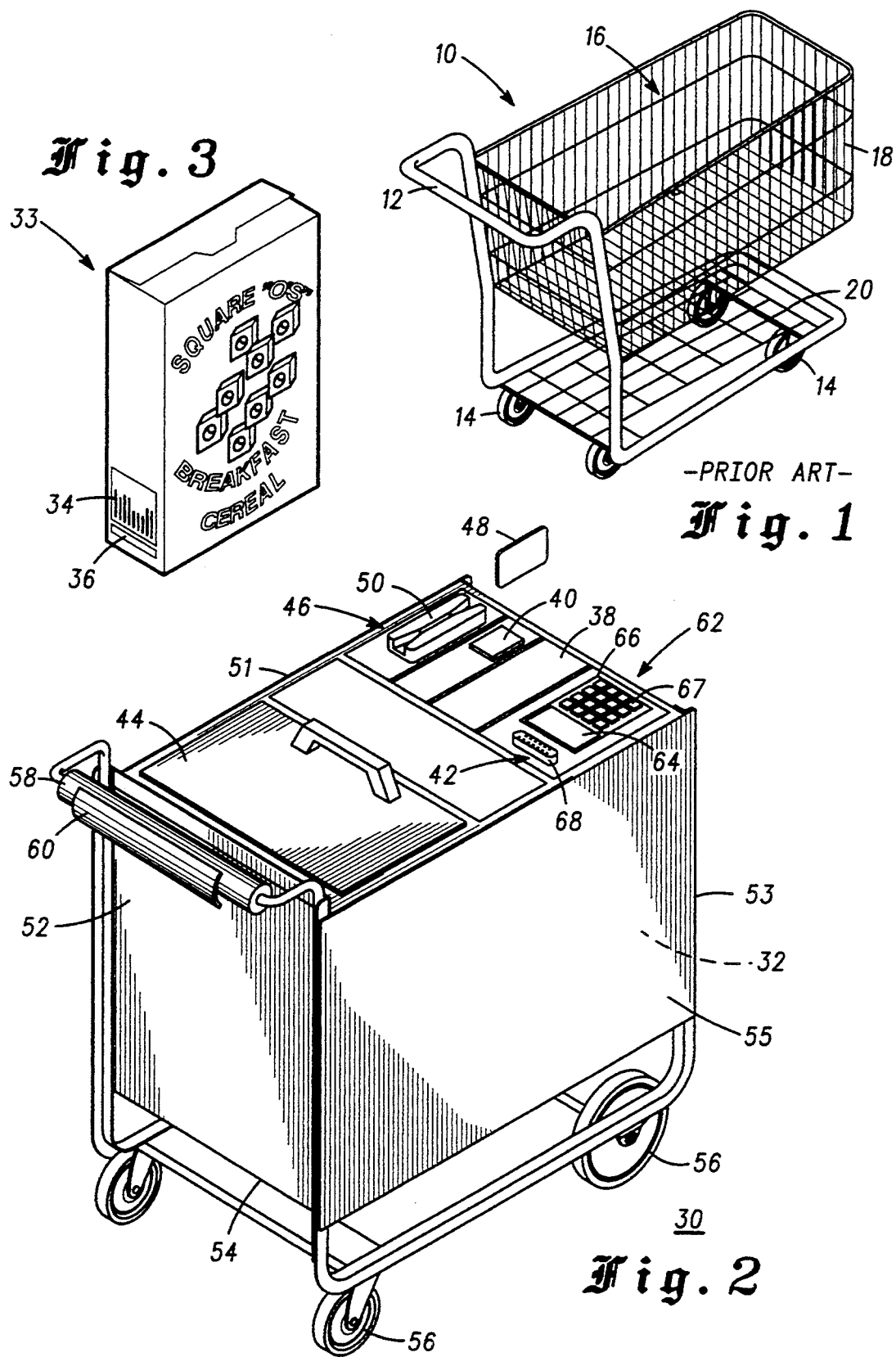

SELF SERVICE CART SYSTEM

FIELD OF THE INVENTION

This invention relates generally to shopping carts and, more particularly, to a shopping cart having a built in bar code scanner and security scanner.

BACKGROUND OF THE INVENTION

In the past grocery stores did not have shopping carts. A customer would ask the clerk for the items he intended to purchase and the clerk would go around the store, gather and package the items and total the price of the purchase for the customer.

When the shopping cart was first introduced to stores common wisdom was that the customers would never find the items they wanted without help. As customers grew accustomed to the layout of the stores, the stores were able to service more customers with fewer employees. The grocery cart allowed store employees to concentrate on stocking the shelves and checking out customers. The store's employees no longer had to gather the items for the customer; this resulted in improved productivity for grocery stores, which in turn resulted in lower prices for the consumer.

As this store format became accepted, one of the major labor costs for stores became checking out customers. Checkers were required to hand enter the price and to bag every item. This was a slow, inaccurate process and the major bottleneck in the grocery sales process.

This problem was alleviated by the introduction of a bar code on products and a bar code scanner at the check out lines. This allowed checkers to greatly increase their productivity and accuracy. It also greatly improved inventory management and purchasing accuracy. However, customer lines at the check-out were not significantly reduced, since most stores used this productivity advantage to reduce the number of checkers.

One of the major complaints customers have about grocery shopping is waiting in line to be checked out, pricing and bagging of each item. Most stores have numerous check out lanes; these lanes remain mostly unused except during peak hours and days, such as Saturday afternoons. This results in a large area of the store having a low utilization.

This invention is directed at overcoming these and other problems.

SUMMARY OF THE INVENTION

It is the object of this invention to provide a self service cart system which allows a customer to perform a bar code scan of a product at the time the product is placed in the cart. This speeds up the check out process by requiring the customer to only pay a cashier, that is, write a check, pay cash or use a credit card at the check out counter.

Another object of the invention is to provide a security system which protects the merchant by ensuring that only properly paid for products leave the store.

An additional object of the invention is to provide the customer assurance that he will only pay for the items he selects and takes home.

An exemplary embodiment of the invention achieves the foregoing objectives in a self service cart system which has a cart with a bar code scanner and a security scanner attached. The cart has a door which provides access to the interior portion of the cart. The cart also has a magnetic card reader. A customer must swipe his card through the reader and enter an appropriate password in order to activate the cart system. A controller unlatches the door only if a product has been scanned for its bar code and the security scanner has converted the product from an unsecured state to a secured state.

The cart system can further be provided with a store inventory control computer which communicates with the controller and acquires the price and description of the products in the cart. The inventory computer tracks the inventory and sales of a store.

The cart can be provided with wheels for mobility and can also have a motor to propel the cart.

In a preferred embodiment, the cart system is also provided with a security sensor. The security sensor checks to make sure only products in the secured state leave the store; an unsecured product will raise an alarm.

Further the cart may have a display. This display can list the products scanned and in the cart, a total price of the products in the cart, a product's location in the store, product advertising and whether the product was properly scanned. A preferred embodiment contemplates the use of a LCD for the display.

One embodiment contemplates the use of a magnetic tag attached to the product. The security scanner converts the tag from a magnetic to a nonmagnetic state. When the tag is in one of either the magnetic or the nonmagnetic states the product is in the unsecured state. When the tag is in the other of the magnetic or nonmagnetic states it is in the secured state.

A second embodiment contemplates the use of an electromagnetic emitting tag attached to the product. The security scanner converts the tag from an emitting state to a non-emitting state. The emitting state corresponds to the unsecured state and the non-emitting state corresponds to the secured state.

A highly preferred embodiment contains a proximity sensor in which the sensor turns off all the power to the cart and locks the wheels when the cart exceeds a predetermined distance from the store.

Other objects and advantages will become apparent from the specification taken in connection with the accompanying drawings.

BRIEF DESCRIPTION OF THE DRAWINGS

FIG. 1 is a perspective view of a prior art grocery cart.

FIG. 2 is a perspective view of a self service cart according to the invention.

FIG. 3 is a perspective view of a product.

DETAILED DESCRIPTION OF THE DRAWINGS

Figure 4:
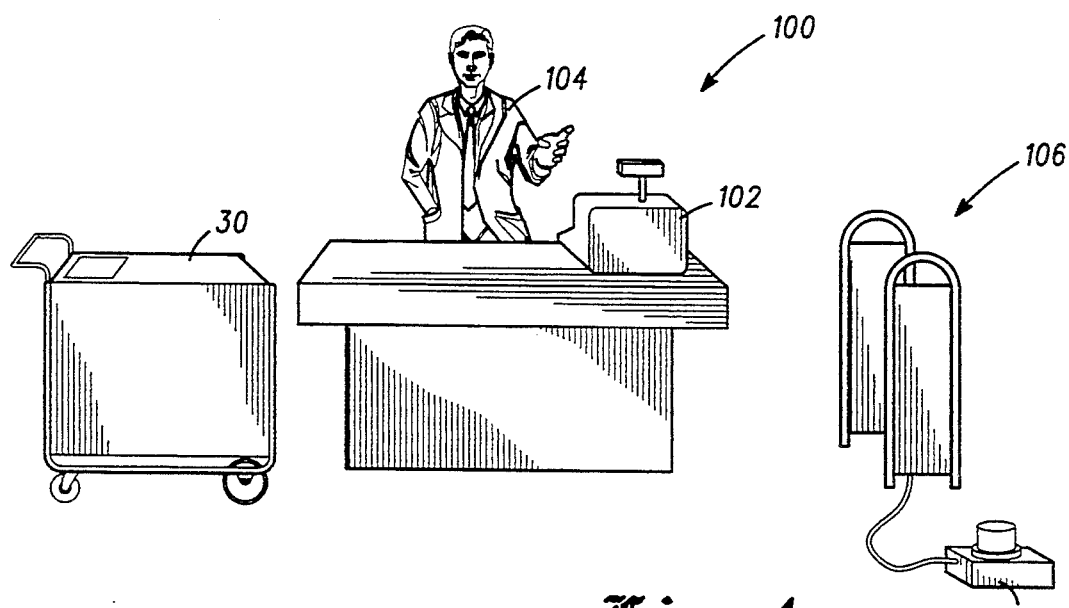
FIG. 4 is a schematic view of the self service cart system.

FIG. 1 illustrates a prior art shopping cart 10. The cart 10 has a handle 12 and a plurality of wheels 14 for moving the cart 10 around a store. An internal space 16 is provided for holding a plurality of products to be purchased. The space 16 is enclosed by a wire mesh 18. A lower shelf 20 is provided for large products.

An exemplary embodiment of a self service cart system 30 according to the invention is shown in FIG. 2. The cart 30 contains an internal space 32 for holding products. When a customer wishes to purchase a product 33 he runs a bar code 34 and a security tag 36 (see FIG. 3) across a bar code scanner 38 and a security scanner 40 simultaneously. A controller 42 determines if the bar code scanner 38 has successfully acquired a price and a description for the scanned product 33. Next the controller 42 determines if the security scanner 40 has successfully converted the security tag 36 from an unsecured state to a secured state. If both scans were successful the controller unlatches a door 44. This allows the customer access to the internal space 32 of the cart 30 for storing and bagging his products 33 until they are paid for at a check out counter 100, shown in FIG. 4. Once the product 33 has been placed in the in the cart 30 the customer closes the door 44. This prevents others from taking products 33, which have been scanned, out of the customer's cart 30, it also prevents others from placing unscanned products 33 into the customers cart 30.

Figure 8:
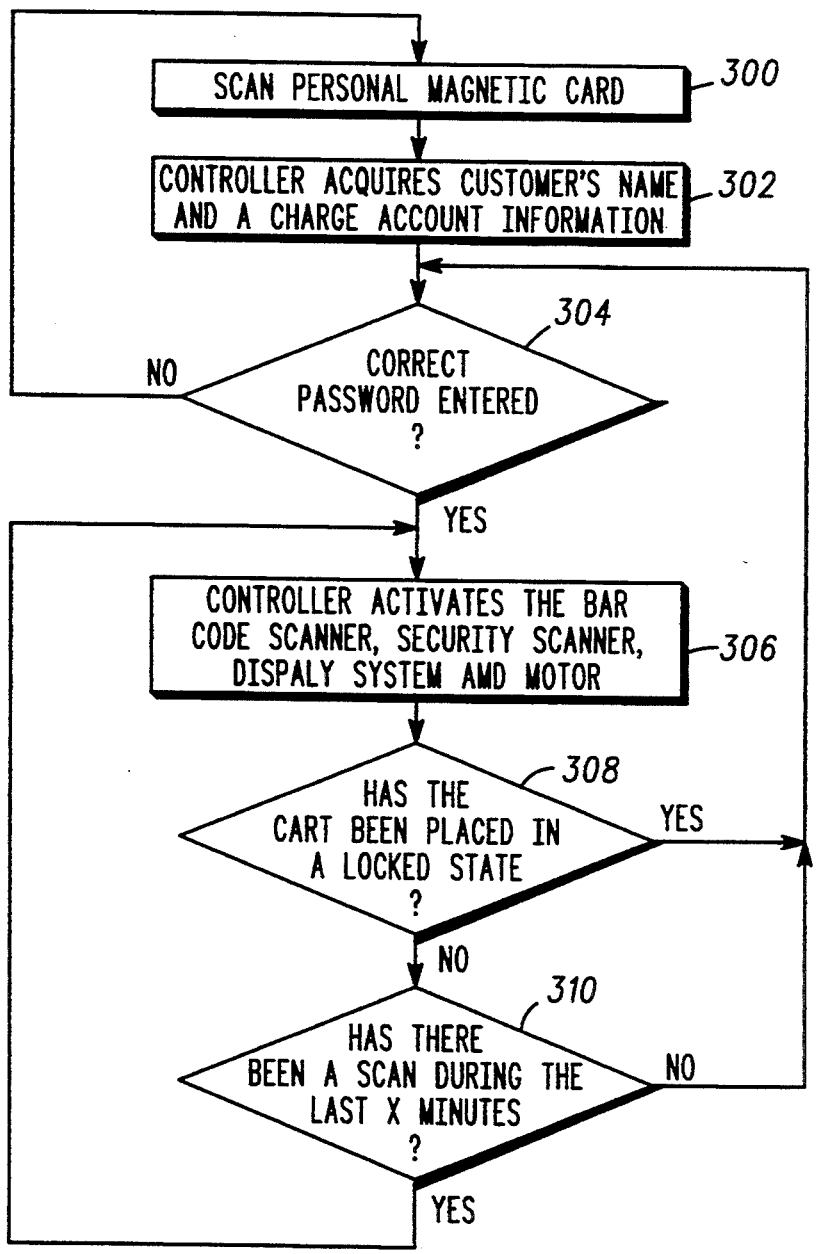
FIG. 8 is a flow chart of the controller's processing of a customer's magnetic card and password.

To prevent people from scanning products 33 and then attempting to walk out the door without paying for them a magnetic card reading system 46 is provided. To activate the cart 30 a customer must first scan his personal magnetic card 48 through a card reader 50. The customer must then enter a password using a key pad 66 of a display system 62, which will be described in detail later. Once the password has been verified by the controller 42, the controller 42 activates the cart 30 which allows the customer to scan products 33 as described above. As shown in the flow chart in FIG. 8, by scanning the personal magnetic card step 300 the controller 42 acquires a customer's name and charge account information step 302. When the customer enters a correct password step 304 this information is verified. The controller 42 then activates the cart 30 for normal operation step 306 as described in this specification. If the customer subsequently attempts to scan products 33 and walk out the door without paying for them the customer can be charged for the products 33 or other remedial procedure can be taken. If the customer places a product 33 in his cart 30 which he subsequently determines that he does not desire to purchase, the product can be removed at a check out counter 100 and appropriate credits made to the customer's bill. If the customer needs to leave his cart 30 unattended for a period of time he can place the cart in a locked state step 308, in FIG. 8, so the cart is deactivated until he re-enters his password. If the customer accidently leaves the cart unattended for too long a period of time the cart is automatically placed in the locked state step 310.

The cart 30 has sides 51, 52, 53, 54, 55 to prevent unauthorized access to the cart 30. The sides 51, 52, 53, 54, 55, can be made of a thin light metal or a substantial plastic material. The cart 30 is provided with a plurality of wheels 56 and a handle 58 for mobility. The cart 30 can be provided with a motor 70 (described in FIG. 5) and an actuator 60. The motor 70 is used to drive a set of wheels 56 when the actuator 60 is depressed. This provides the cart 30 with a self propelled feature.

A display system 62 has a monitor 64 and a keypad 66. The customer can see a running total of the price of all the products 33 selected by the customer on the monitor 64. By pushing a key 67 on the keypad the customer can get the description of all the products 33 selected. If the descriptions are too numerous to fit on the monitor 64 the customer can scroll through the descriptions by pressing other keys 67. The display system 62 can also be used to display product location and product advertising. The display system 62 is connected to the controller 42 in a well known manner. The controller 42 contains the price, description and location of every product 33 the store has in inventory. The controller 42 can be programed to perform the functions described above by a well known manner by those skilled in the art.

Alternatively, a customer could enter his shopping list at the time he enters the store on the display system 62, by selecting from a display of available products 33. The cart 30 then indicates where the product 33 is located and even signals the customer as he passes the display shelf where the product 33 is located.

An in/out (I/O) port 68, of any of number of conventional designs such as RS232 or Centronix, is provided in the cart 30 to transfer the description of the products 33 and the total price of the products 33 selected to an inventory control computer 102 (see FIG. 4). When the customer has selected all the products 33 he is interested in purchasing he propels his cart 30 to the check out counter 100. At that time the inventory computer 102 is connected by a cable (not shown) through the I/O port 68 to the controller 42, which transfers the price, description, and quantity of the products 33 selected. The customer then pays a cashier 104 for the products 33 selected.

The inventory control computer 102 is used for inventory control and monitoring as well as purchasing. Usually there is a single inventory control computer 102 and each of the check out counters 100 are networked to the inventory computer 102. The store management also sets the prices of the products 33 and keeps a master list of the products 33 for purchase on the inventory control computer 102. The description and price of all the products 33 in the stores inventory is downloaded to the controllers 42 on the individual carts 30. The inventory control computer 102 is of a conventional design presently used in most stores, and therefore the details will not be discussed in detail here.

After the products 33 have been paid for they may be transferred to a conventional cart 10 for transportation to the customer's personal vehicle.

When the customer leaves the store he must pass through a security sensor 106. The sensor 106 determines if the tag 36 is in a secured or unsecured state. If the tag 36 is in an unsecured state it indicates a product 33 was not properly scanned. The security sensor 106 the sets off an alarm 107 that warns store personnel someone is attempting to leave without paying for a product 33. The alarm 107 can be a light or a sound or trigger a wide variety of other devices, including locking the doors to the store.

The security tag 36 and sensor system 106 is one of a well known type. Presently, the invention contemplates the tag 36 being of the type that can be magnetized and demagnetized. The tag 36 is initially magnetized which corresponds to the unsecured state. When the product 33 is scanned over the security scanner 40 the tag 36 is demagnetized or degaussed and this corresponds to the secured state. If the tag 36 is in the magnetized state when it passes through security sensor 106 this is detected and the alarm 107 is set off.

Alternatively, the security tag 36 can be of the type that emits an RF signal. In this case the tag 36 is in the unsecured state when the tag 36 is emitting. When the tag is scanned a shield is placed over the tag 36 which prevents the tag 36 from emitting. The non-emitting state corresponds to the secured state. 3M is one of the manufacturers which makes this type of security system.

Figure 5:
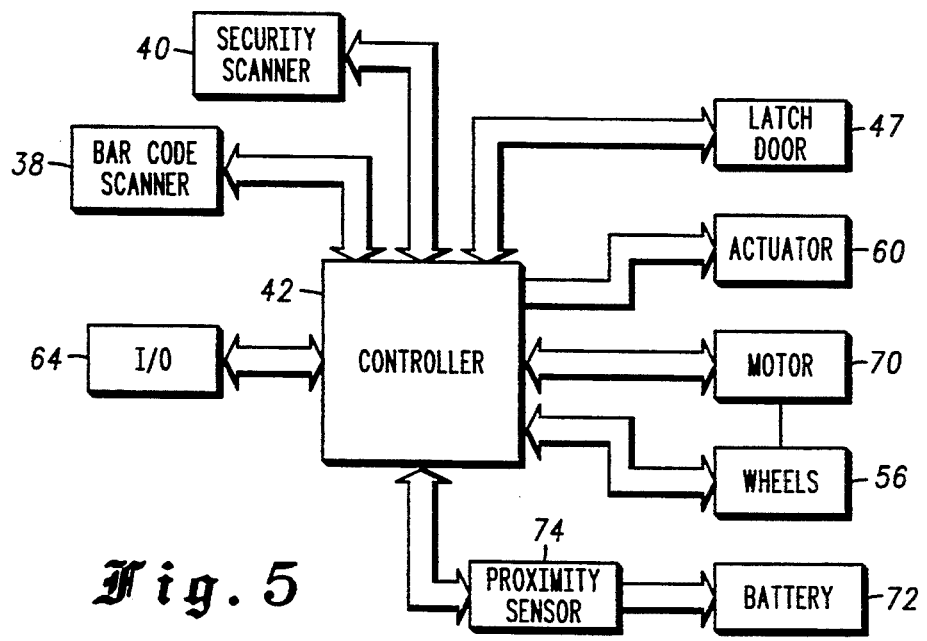
FIG. 5 is a block diagram of the cart according to the invention.
Figure 7:
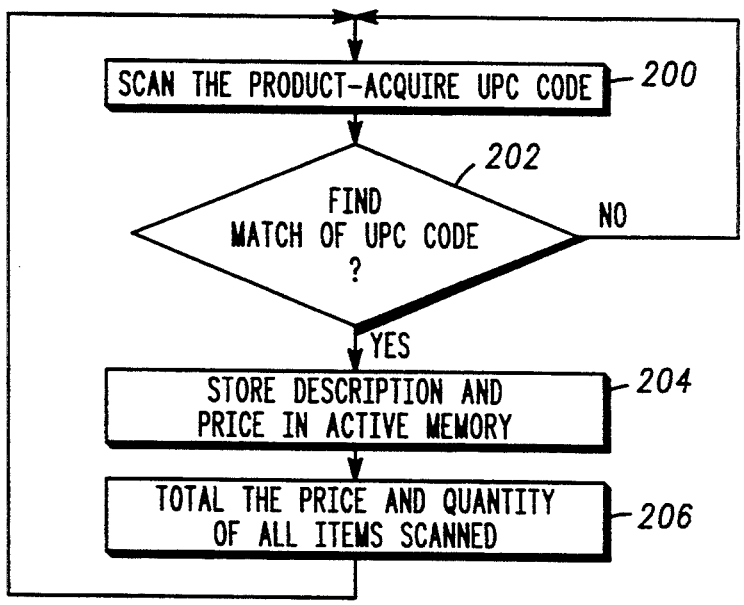
FIG. 7 is a flow chart of the controller's decision process in finding the price and description of the product scanned.

FIG. 5 shows a block diagram of the cart 30 of FIG. 2. The controller 42 acquires a Universal Product Code (UPC) step 200, as described in FIG. 7, from the bar code scanner 38 when the product 33 has been properly scanned. This UPC code corresponds to a particular product 33 the store is selling. The controller 42 compares and the UPC code to the codes for the products 33 stored in its memory. When it finds a match step 202 the description and price are stored in the controllers active memory step 204. The controller 42 then totals the price of all the products 33 scanned and the quantity of the products scanned step 206.

Figure 6:
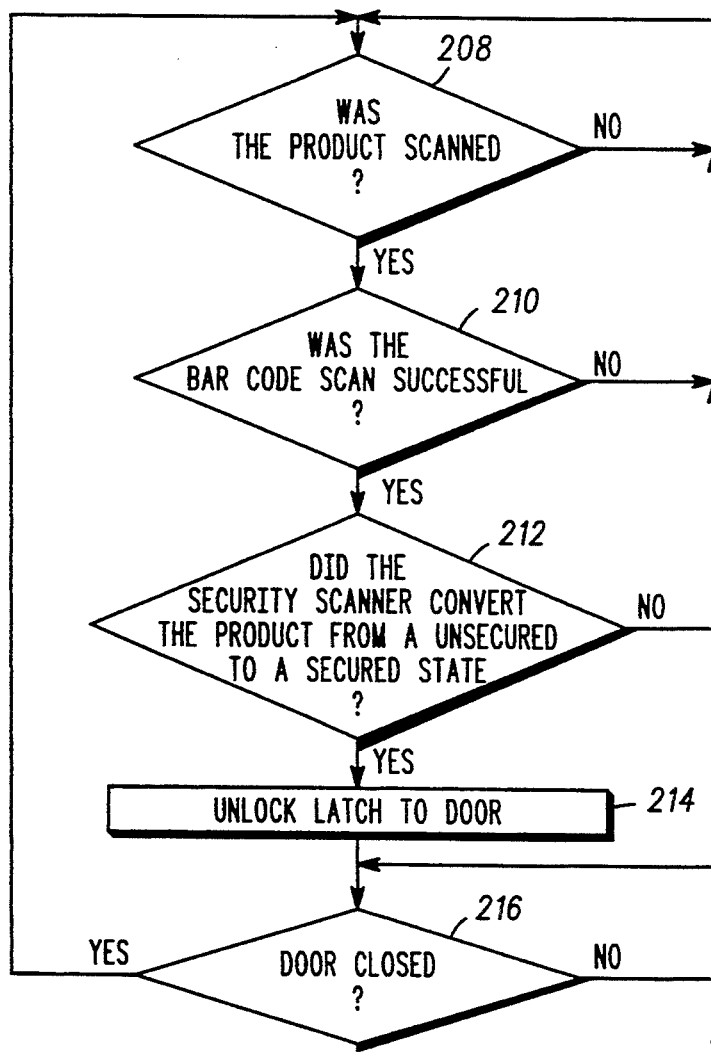
FIG. 6 is a flow chart of the controller's decision process during a scan.

The product 33 is scanned simultaneously over the bar code scanner 38 and the security scanner 40. The controller is sent a code from the security scanner 40 that the product 33 was successfully scanned. The process can best be understood with reference to the flow chart in FIG. 6. The product 33 is scanned step 208, then the controller determines if the bar code scan was successful step 210. If the answer is yes the controller next determines if the security scan was successful step 212. If either the bar code or the security scan was unsuccessful the controller returns to step 208. If both scans were successful the controller unlatches the door step 214, allowing access to the cart 30. The controller 42 then waits for the customer to close the door 44 in step 216. Once the door 44 is closed the process is started over.

The cart 30 may be provided with a motor 70 to propel the cart 30. The motor 70 is connected to the wheels 56 of the cart 30 and is activated by depressing the actuator 60. A battery 72 provides power to the various parts on the cart.

One embodiment of the cart 30 contemplates the addition of a proximity sensor 74, which is used to limit the distance from the store the cart 30 remains operable. The preferred embodiment has an RF signal emitted from a location in the store. When the cart 30 is moved more than a predetermined distance from the signal the proximity sensor 74 is activated, at which time, the proximity sensor turns off the power to the cart and sends a code to the controller to lock the wheels 56 of the cart and shut down all other functions. Other proximity sensors can be used, for instance, a wire that emits a signal can be buried to form an invisible fence, as commonly used for dogs and other pets. Since this part of the system is of conventional design and well known to those skilled in the art it will not be described further.

As can be seen from the above description a self service cart system is provided which reduces the time for customers to check out from a store. This cart system reduces the workload of the checkers at the store and therefore reduces the cost of labor to the store. The faster checkout time results in fewer check out lanes which frees up valuable store space.

The cart system 30 has provided a variety of features to ensure the customer is not charged for products 33 he does not want and does not walk off with products 33 he has not purchased. The customer must first swipe his magnetic card 48 and enter a pass number that uniquely identifies the customer. This discourages a customer from scanning products not placing them in the cart 30 and walking out the store. The products 33 have a security tag 36 and sensor 106,107 which ensures only properly scanned products 33 leave the store. Other people are prevented from using a customers cart 30 to scan products 33 (thus placing the product 33 in the unsecured state) by the lock out feature (step 308 of FIG. 8). This allows the customer to to inactivate the cart until he is ready to scan another product 33. The customer can be sure he is not charged for any extra products 33 by inactivating his cart, checking the list of products 33 selected and if he has scanned a product he did not wish to purchase he can get an appropriate credit at the checkout counter 100. These are in addition to the normal store security measures.

Thus a cart has been shown which achieves the advantages of decreasing the time spent in the checkout process, eliminating a major complaint of customers, while reducing labor costs. The shorter check out time means fewer check out lanes are needed which frees up valuable floor space, increasing store revenues or lowering rental costs. It will be obvious to those skilled in the art that many modifications can be made without departing from the spirit of the invention. All such modification are deemed to be part of the inventor's exclusive property. The only limitations on the invention are those found in the appended claims.

We claim:

1. A self-service cart system comprising:
    a cart having an electrically latchable door;
    a single means for optically acquiring a price and description from a product, said means being attached to said cart;
    a security scanner for converting a tag on said product from an unsecured state to a secured state, said security scanner being attached to said cart;
    said tag changing from either a magnetic state to a non magnetic state or a non magnetic state to a magnetic state when converted by said security scanner; and
    a controller, attached to said cart, for storing said price and identity and allowing access to said cart, through said door, when the tag has been converted to the secured state and the price and identity of said product has been stored.

2. The self service cart system of claim 1 wherein said means for acquiring the price and description of said product is a bar code scanner.

3. The self service cart system of claim 1 further including a magnetic card reader coupled to the controller, the magnetic card reader for reading a customer's magnetic card, the customer's magnetic card containing a customer's charge account information, when the customer enters his password which is verified by the controller, the controller activates the cart.

4. The self service cart system of claim 1 further including a inventory control computer for acquiring said price and description of said products in the cart for tracking a sales and inventory in a store.

5. The self service cart system of claim 1 further including a security sensor remote from said cart and through which a product must pass, said sensor determining if a tag is in the secured or unsecured state and raising an alarm if said tag is in the unsecured state.

6. The self service cart system of claim 1 wherein said door has a latch which is operated by the controller.

7. The self service cart system of claim 1 further including a motor for propelling the cart.

8. The self service cart system of claim 1 further including a display, said display being able to show the total price of all the products scanned and in the cart.

9. The self service cart system of claim 8 wherein the display is able to show product information, product location, product advertisements and show if the product was correctly scanned.

10. The self service cart system of claim 1 further including a proximity sensor, said proximity sensor automatically shutting off all power to said cart and immobilizing said cart when the cart exceeds a predetermined distance from a store.

11. A self service cart system comprising:
a cart;
a bar code scanner attached to said cart;
a security scanner attached to said cart;
a door connected to said cart, for allowing access to the cart;
a controller attached to said cart and communicating with said bar code scanner, said security scanner and controlling said door;
a magnetic card reader, connected to the controller, for reading a customer's magnetic card, the magnetic card including a customer's charge account information, when the customer enters the correct password after scanning their magnetic card the controller activates the cart; and
a security sensor remote from said cart and through which all scanned items must pass.

12. The self service cart system of claim 11 wherein said security scanner converts a tag from an electromagnetic emitting state to a non-emitting state and the secured state corresponds to the non-emitting state.

13. The self service cart system of claim 11 further including a display, said display being able to show the total price of all the products scanned and in the cart.

14. The self service cart system of claim 11 further including a proximity sensor, said proximity sensor automatically shutting off all power to said cart and immobilizing said cart when the cart exceeds a predetermined distance from a store.

15. A self service cart system for purchasing groceries and other nondurable goods comprising:
a cart having wheels for mobility and an internal space for storing items;
a plurality of products for sale having a bar code and a security strip attached to said product, such that the bar code and the security strip are adjacent or overlapping;
a bar code scanner attached to said cart for optically reading said bar code on said item;
a security scanner, attached to said cart being adjacent to said bar code scanner, for converting said security strip on said product from an unsecured state to a secured state;
an electrically latchable door connected to said cart allowing access to said internal space of said cart when said product has been correctly scanned by said bar code scanner and said security scanner has converted said security strip from an unsecured state to a secured state;
a communications port attached to said cart; an inventory computer, separate from said cart, receiving and storing a quantity, a price and a description of the products scanned by said cart, through said communications port and down loading the current price of said products to the cart through said communications port;
a controller attached to said cart in electrical communication with said bar code scanner, said security scanner and said latchable door, for 1) determining if the bar code scan was successful and the product is in the secured state, then releasing said electrically latchable door 2) determining which product was scanned, storing the quantity of the products scanned and the total price of all scanned products scanned and communicating this information, through said communications port and said communications cable, to said inventory computer;
a magnetic card reader, a magnetic card and a password which activates the controller when the magnetic card is scanned and an appropriate password is entered; and
security sensor remote from said cart and through which an products must pass, said sensor determining if said items are in the secured or unsecured state and raising an alarm if any of said items are in an unsecured state.

* * * * *